United States Patent
Ekman et al.

(10) Patent No.: US 9,341,369 B2
(45) Date of Patent: May 17, 2016

(54) METHOD FOR BURNER AND BURNER DEVICE

(71) Applicant: AGA AB, Lidingo (SE)

(72) Inventors: Tomas Ekman, Saltsjo-Boo (SE); Anders Lugnet, Rimbo (SE)

(73) Assignee: AGA AB, Lidingo (SE)

( * ) Notice: Subject to any disclaimer, the term of this patent is extended or adjusted under 35 U.S.C. 154(b) by 276 days.

(21) Appl. No.: 14/206,128

(22) Filed: Mar. 12, 2014

(65) Prior Publication Data

US 2014/0193758 A1    Jul. 10, 2014

Related U.S. Application Data

(62) Division of application No. 12/330,549, filed on Dec. 9, 2008, now Pat. No. 8,899,970.

(30) Foreign Application Priority Data

Dec. 10, 2007   (SE) ...................... 0702741

(51) Int. Cl.

| F23C 5/00 | (2006.01) |
|---|---|
| F23L 7/00 | (2006.01) |
| F23D 14/32 | (2006.01) |
| F23D 14/66 | (2006.01) |
| F23L 15/02 | (2006.01) |
| F23L 9/00 | (2006.01) |
| F23L 15/04 | (2006.01) |

(52) U.S. Cl.
CPC ................ *F23L 7/007* (2013.01); *F23D 14/32* (2013.01); *F23D 14/66* (2013.01); *F23L 9/00* (2013.01); *F23L 15/02* (2013.01); *F23L 15/04* (2013.01); *Y02E 20/344* (2013.01)

(58) Field of Classification Search
CPC ............. F23L 7/007; F23L 15/04; F23L 9/00; F23D 14/66; F23D 14/32
USPC .............. 431/8, 7, 10, 11, 215, 207; 110/304, 110/349; 126/52 B
See application file for complete search history.

(56) References Cited

U.S. PATENT DOCUMENTS

| 4,874,311 A | 10/1989 | Gitman |
| 4,923,391 A | 5/1990 | Gitman |
| 5,154,599 A | 10/1992 | Wunning |
| 6,036,476 A | 3/2000 | Mitani et al. |
| 6,113,874 A * | 9/2000 | Kobayashi ............... C01B 3/34 252/373 |
| 7,258,831 B2 | 8/2007 | Vecchiet et al. |
| 2002/0072020 A1 | 6/2002 | Crane et al. |
| 2004/0219079 A1* | 11/2004 | Hagen ................... F01K 21/047 422/607 |
| 2005/0239005 A1 | 10/2005 | Lugnet et al. |
| 2006/0093978 A1 | 5/2006 | Simard et al. |
| 2009/0130617 A1* | 5/2009 | Cain ...................... F23C 9/006 431/161 |

FOREIGN PATENT DOCUMENTS

| EP | 1 634 856 | 3/2006 |
| JP | 11-264667 A | 9/1999 |

* cited by examiner

*Primary Examiner* — Gregory Huson
*Assistant Examiner* — Nikhil Mashruwala
(74) *Attorney, Agent, or Firm* — Young & Thompson

(57) ABSTRACT

Burner device (2) for an industrial furnace (1) comprising a channel (3) for fuel, a channel (4) for a first oxidant, an outlet (9) for flue gases, a control device (10) and a heat buffer (7), where the first oxidant and the flue gases alternating are led through the heat buffer (7). The invention is characterized in that a separate lancing device (6) is arranged to supply a second oxidant to the burner device (2).

13 Claims, 1 Drawing Sheet

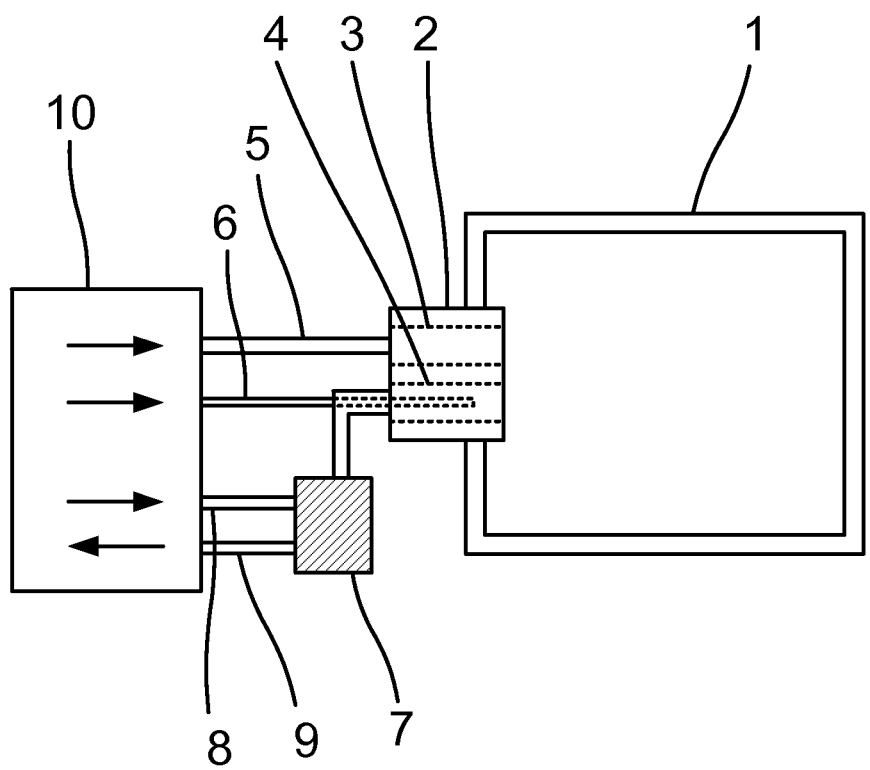

METHOD FOR BURNER AND BURNER DEVICE

The present invention relates to a method and a burner device for increasing the efficiency during heating of an industrial furnace. More specifically, the invention relates to a so called regenerative burner with improved combustion efficiency.

Herein, the expression "regenerative" burner device is used for a burner device in which the cold oxidant and hot flue gases alternatingly are led through a heat buffer, so that the heat of the flue gases is used for preheating of the oxidant. This increases efficiency during combustion.

For example, the heat buffer may consist of a pipe partially filled with heat absorbing material, such as balls or a honeycomb structure made from a ceramic or a metal material. A commonly used operation scheme involves about 30 seconds of percolation of hot flue gases through the buffer, followed by about 30 seconds of percolation of ambiently tempered oxidant, which oxidant is thereby heated by the heat absorbing material. The combustion may be alternated between two or more burners, whereby hot flue gases from the other burners are led out from the furnace through the oxidant channel of one of the burners at a time and through the heat buffer, or one burner may be furnished with several oxidant channels that are used alternatingly to supply oxidant to the burner and carry flue gases out from the furnace.

Such regenerative burner devices are typically optimized for a specific, high power. This works well for continuous heating, but is problematic for batch wise heating. Namely, batch wise heating of metal material often takes place over two steps, where an introductory, high power step, herein denoted "heating step", aims at heating the furnace and the surface of the metal material to a predetermined final temperature, and a final, low power step, herein denoted "temperature homogenizing step", aiming at letting the whole metal material assume a predetermined, homogenous temperature profile through heat conduit.

The heating step may for instance last between 2 and 10 hours, depending on the prerequisites, during which time the burner or burners is or are operated at or near their optimal, high power. The temperature homogenizing step may correspondingly last between 1 and 40 hours, and involves considerably lower burner powers.

During parts of the heating step, the furnace temperature is essentially lower than the desired process temperature, why the heat absorbing material in the heat buffer cannot be heated to the temperature which is needed for the burner to reach maximum efficiency.

Furthermore, regenerative burners being dimensioned for the heating step are at the same time over dimensioned for the temperature homogenization step, why their power must be adjusted to be lower during this step. By way of example, this may be done by using a so called on/off procedure, in which the burner alternatingly and periodically is turned on or off. Among other things, this leads to that the temperature in the heat buffer decreases during the switched off time, which substantially reduces the efficiency of the burner.

Because of the above described considerations regarding choice of optimal combustion power, regenerative burners are often designed with a maximum power which is near that needed during the heating step. As a consequence, substantial costs and/or construction changes are needed if an even higher power for some reason is needed at a later time, since regenerative burners are comparatively large and bulky by design, and since each such burner also normally demands correctly dimensioned fan devices for conveying the gases through the heat buffer, which fans therefore also need to be changed.

The present invention solves the above described problems.

Thus, the invention relates to a burner device for an industrial furnace comprising a channel for fuel, a channel for a first oxidant, an outlet for flue gases, a control device and a heat buffer, where the first oxidant and the flue gases alternatingly are led through the heat buffer, and is characterized in that a separate lancing device is arranged to provide a second oxidant to the burner device.

Furthermore, the invention relates to a method of the type and with mainly the features as described in claim 11.

In the following, the invention will be described in detail, with reference to exemplifying embodiments of the invention and to the appended drawing, where:

FIG. 1 is an overview from the side principally showing a burner device according to the invention.

In an industrial furnace 1 for batch wise heating of metal material a regenerative burner device 2 is arranged. More than one burner device may be arranged inside the furnace 1, depending on the actual application. Especially, burner devices may be arranged in pairs in the industrial furnace 1, whereby such burner pairs may be operated alternatingly.

The burner device 2 comprises a channel 3 for fuel and a channel 4 for a first oxidant. The fuel may be any suitable, gaseous fuel, such as propane or natural gas. The first oxidant is for example air, but may also be oxygen enriched air or oxygen gas with an oxygen content of at least 80 percentages by weight. The burner device 2 gives rise to a flame (not shown), which is directed into and therefore heats the furnace space. Moreover, the burner device 2 may be of the DFI (Direct Flame Impingement) type, and/or of so called flameless type, whereby a visual flame is missing.

Furthermore, the burner device 2 comprises a supply conduit 5 for fuel and a supply conduit 8 for the first oxidant. The first oxidant is supplied through the supply conduit 8 and into a heat buffer 7, containing a heat absorbing material such as described above, and thereafter on to the channel 4.

An outled conduit 9 for flue gases also runs from the heat buffer 7.

The supply conduit 5 for fuel, the supply conduit 8 for the first oxidant and an outlet conduit 9 for flue gases are all connected to a control device 10 that controls the operation of the burner device 2.

The control device 10 may control the burner device 2 for operation either in combustion mode or in reheating mode. In combustion mode, fuel and the first oxidant are supplied through the conduits 5 and 8, respectively, and the mixture is combusted so that the furnace space is heated. In reheating mode, neither fuel nor the first oxidant are supplied, but flue gases are conveyed out from the furnace space, through the channel 4 for the first oxidant, on to the heat buffer 7 and out through the outlet conduit 9, for subsequent removal. Thus, the heat absorbing material in the heat buffer 7 is heated by the hot flue gases during reheating mode operation, and the room tempered, first oxidant is preheated by the same material in the heat buffer 7 during combustion mode operation.

The control device 10 controls the inbound and outbound gas streams in a suitable manner, for instance using a valve arrangement (not shown) and/or suitable, known fans (not shown).

The burner device 2 may also comprise a separately arranged outlet conduit for flue gases that run out from the furnace space and into the heat buffer 7.

During operation, the control device 10 accomplishes that the burner device 2 is alternated between combustion mode and reheating mode, whereby the thermal energy in the flue gases is recovered for heating of the first oxidant, which increases the combustion efficiency. Either one single burner device may be used, which in this case only heats the furnace space when operated in combustion mode, or several burner devices may be used in combination. In the latter case, one or several burner devices may be operated in heating mode and the rest of the burner devices be operated in reheating mode, leading to that the furnace space is heated at all times without interruption. According to a preferred embodiment, all burner devices except one in a burner aggregate are operated in combustion mode, and the last such burner device is operated in reheating mode.

According to another preferred embodiment, burner devices are operated in pairs, so that the first device is operated in heating mode at the same time as the second is operated in reheating mode, after which the roles are swapped, and so on.

Several burners may share the same heat buffer 7. In this case, a suitable known valve arrangement is used for conveying the first oxidant through a first channel in the heat buffer 7 to burner devices being operated in heating mode, and at the same time conveying the flue gases from burner devices being operated in reheating mode through a second, separate channel in the heat buffer 7 and out through the outlet conduit 9. In this case, the first and the second channels are thermally connected, for example by sharing the same heat absorbing material in the form of a common wall or the like.

In the channel for the first oxidant 4 there is provided a lance 6, which is fed with a second oxidant. Preferably, this second oxidant is comprised of at least 80 percentages by weight oxygen, more preferably at least 95 percentages by weight oxygen. Such an elevated concentration of oxygen in the second oxidant leads to, among other things, high combustion efficiency.

The lance 6 is also connected to, and controlled by, the control device 10.

In a regenerative burner device an important factor, limiting the maximum combustion power, is the amount of preheated oxidant that may be led out through the channel for oxidant 4 per time unit. This depends upon the capacity of the heat buffer 7 as well as on the fact that the heated oxidant has a lower density than cooler oxidant, which results in a larger volume oxidant needed in order to reach the same weight amount. To the contrary, it is comparatively easy to increase the amount of supplied fuel.

Since the second oxidant is supplied through the lance 6, one can increase the maximum combustion power without having to in other ways increase the dimensions of the components of the burner device 2, something which would lead to the above described problems with over dimensioning during the temperature homogenizing step.

Furthermore, it is preferred that the second oxidant is supplied at an elevated velocity, preferably a velocity above about 200 m/s, more preferably a velocity which at least amounts to the acoustic velocity. This creates an ejector effect, which reduces the pressure downstream of the heat buffer 7, in turn resulting in an increased flow of preheated oxidant and thereby increased efficiency. At the same time, of course the supplied second oxidant also takes part in the combustion reaction, hence resulting in a higher combustion power.

The amount of the second oxidant which is supplied through the lance 6 may be controlled either by adjusting the size of the orifice of the lance 6 or by adjusting the pressure of the second oxidant being supplied through the lance 6, and may be chosen depending on the purpose of the actual application, in terms of for example combustion power, desired oxygen enrichment and limit amounts for various combustion products such as $NO_X$ gases. The control may take place continuously during operation, either by a continuous change of the pressure upstream of the lance 6 or according to an on/off procedure, or a single time before the initialization of a certain operational step.

Through such control, and unlike the case for known regenerative burner devices, it is thus possible to control the power of the burner device 2 over a broad power interval, essentially without the efficiency at a given power within this interval being deteriorated.

Therefore, the regenerative burner device 2 may be optimized for operation also during a temperature homogenizing step, when the power demands are relatively low, which optimization leads to high efficiency. Thus, during this step little or no second oxidant is supplied through the lance 6. Since the power of the burner device 2 is low at this time, the need for using an on/off procedure for additionally decreasing the power during this step is lessened or disappears completely.

On the other hand, during a heating step preceding the temperature homogenizing step, when the power needs of the burner device 2 are higher, the second oxidant is supplied through the lance 6 to a comparatively large extent. This results in the combustion power increasing substantially, however with preserved efficiency. As a matter of fact, the additional, second oxidant, supplied at an elevated velocity, results in the heating power of the burner device 2 increasing in comparison to conventional, regenerative burner devices 2, which decreases the time necessary for completion of the heating step.

The amount of the second oxidant that is lanced in the burner device 2 may be controlled in different ways, such as is described above, but the average supplied amount of second oxidant per time unit is less during the temperature homogenizing step than during the heating step.

Also, it is possible to apply the present invention to many existing burner devices with no larger alterations, except for the installation of a lance for additional oxidant in the existing burner device. Specifically, existing fan devices and other peripheral equipment normally need not be replaced. Hence, the invention achieves a relatively cheap way of substantially broadening the power interval over which high combustion efficiency may be upheld, and at the same time achieving an increase in the maximum power of the existing combustion device.

Above, preferred embodiments have been described. However, it is apparent to the skilled person that many alterations may be made to the described embodiments without departing from the idea of the invention.

For example, it is possible to arrange several channels for a first oxidant in the burner device 2. In this case, it is preferred to arrange a lance for a second oxidant in each such channel for the first oxidant. By the help of such an arrangement, a better control over the flame resulting from the burner device may be achieved, and the power of the burner device may be increased. It is also possible to arrange lances for the second oxidant in merely one or only in some of the channels for the first oxidant.

Thus, the invention shall not be limited to the described embodiments, but be variable within the scope of the appended claims.

The invention claimed is:

1. A method for increasing efficiency when heating an industrial furnace using a burner device comprising a first channel (3) for fuel, a second channel (4) for a first oxidant, the second channel (4) for the first oxidant being i) separate from the first channel (3) for the fuel, and ii) outside of the channel (3) for the fuel, an outlet (9) for flue gases, a control device (10), and a heat buffer (7), the method comprising the steps of:

supplying the fuel through the first channel;

alternatingly leading the first oxidant and the flue gases, in a gas flow direction toward the burner device, through the heat buffer and from the heat buffer through the second channel to the burner device; and supplying a second oxidant, comprised of at least 80 percentages by weight oxygen, via a separate lancing device to the burner device through the second channel, the second oxidant being supplied at a velocity which is at least sonic velocity, so that an ejector effect is created downstream of the heat buffer in relation to the gas flow direction towards the burner device, such that a flow of preheated oxidant is increased, and wherein the lancing of the second oxidant is supplied in the first channel for the first oxidant but not in the channel for the fuel.

2. The method of claim 1, wherein, the control device controls an amount of the lanced secondary oxidant over time, so that different amounts of the lanced secondary oxidant are respectively provided during corresponding different heating stages of the furnace.

3. The method according to claim 1, wherein the burner device batch wise heats metal material in the industrial furnace.

4. The method according to claim 1, wherein the first oxidant is air.

5. The method according to claim 1, wherein the second oxidant is comprised of at least 95 percentages by weight oxygen.

6. The method according to claim 1, wherein the lancing device supplies the second oxidant in the first channel for the first oxidant at a velocity above 200 m/s.

7. The method according to claim 1, wherein the control device controls the supply of the second oxidant continuously during operation.

8. The method according to claim 1, wherein the control device controls the supply of the second oxidant using an on/off procedure.

9. The method (2) of claim 3, wherein during heating of the metal material in the industrial furnace, the second oxidant is supplied during a first heating step where the average supply per time unit of the second oxidant thereafter is completely or partially decreased during a second temperature homogenising step.

10. The method according to claim 1, wherein the lancing of the second oxidant at the sonic velocity creates the ejector effect reducing pressure downstream of the heat buffer in the gas flow direction.

11. The burner device according to claim 1, wherein the ejector effect takes place in the second channel but not in the first channel.

12. The burner device according to claim 6, wherein the ejector effect takes place in the second channel but not in the first channel.

13. The burner device according to claim 10, wherein the ejector effect takes place in the second channel but not in the first channel.

* * * * *